United States Patent [19]

Riedl et al.

[11] Patent Number: 5,006,032
[45] Date of Patent: Apr. 9, 1991

[54] MOBILE AND STEERABLE LIFTING AND SETTING-DOWN APPARATUS FOR LARGE TRANSPORTABLE RECEPTACLES

[76] Inventors: Reinhold Riedl, Von-Berlichingen-Str. 3, D-8760 Miltenberg; Konrad Lazarus, Am Steiggraben 9, D-6982 Freudenberg/Main, both of Fed. Rep. of Germany

[21] Appl. No.: 404,428
[22] Filed: Sep. 8, 1989
[30] Foreign Application Priority Data Sep. 8, 1988 [DE] Fed. Rep. of Germany ....... 3830530

[51] Int. Cl.$^5$ ............................................. B60P 3/40
[52] U.S. Cl. ................................. 414/458; 280/418.1; 280/442
[58] Field of Search ..................... 414/458; 280/418.1, 280/419, 442, 444, 476.1

[56] References Cited

U.S. PATENT DOCUMENTS

| | | | |
|---|---|---|---|
| 2,785,814 | 3/1957 | Corley | 414/458 |
| 3,193,301 | 7/1965 | Talbert et al. | 414/458 X |
| 3,631,999 | 1/1972 | Walerowski | 414/458 |
| 4,134,601 | 1/1979 | Propst | 280/444 X |
| 4,452,555 | 6/1984 | Calabro | 414/458 X |

FOREIGN PATENT DOCUMENTS

| | | | |
|---|---|---|---|
| 0038082 | 10/1981 | European Pat. Off. | 280/418.1 |
| 1013529 | 8/1957 | Fed. Rep. of Germany | 280/442 |
| 3723302 | 1/1989 | Fed. Rep. of Germany | 414/458 |
| 0482134 | 3/1938 | United Kingdom | 280/442 |
| 1351827 | 11/1987 | U.S.S.R. | 280/419 |
| 1373596 | 2/1988 | U.S.S.R. | 414/458 |

Primary Examiner—Robert J. Spar
Assistant Examiner—John VandenBosche

[57] ABSTRACT

In mobile and steerable lifting and setting-down apparatus for large transportable receptacles, in order to ensure steerability of the apparatus not only in pulling operation, but also in backward pushing operation, steering arms are attached to be movable up and down to the wheel cradles carrying the running wheels, the steering arms being articulated by their free ends to a steering rod which is mounted to be movable rotationally about its axis. A central shaft is coupled to the steering rod to be relatively movable in the direction of the axis of the shaft. The central shaft is pivoted by its inner end by means of a pintle to a connecting piece which in turn is mounted on the large receptacle to be swingable about an axis parallel to the base of the receptacle. The articulation point for the central shaft on the connecting piece which is formed by the pintle is located laterally in alignment with the pivots of the two adjacent wheel cradles. The steering of the running wheels takes place through the central shaft by way of the steering rod and steering arms while in pulling or backward pushing operation the corresponding forces act on the large receptacle by way of the central shaft, the connecting piece and the connecting posts.

8 Claims, 5 Drawing Sheets

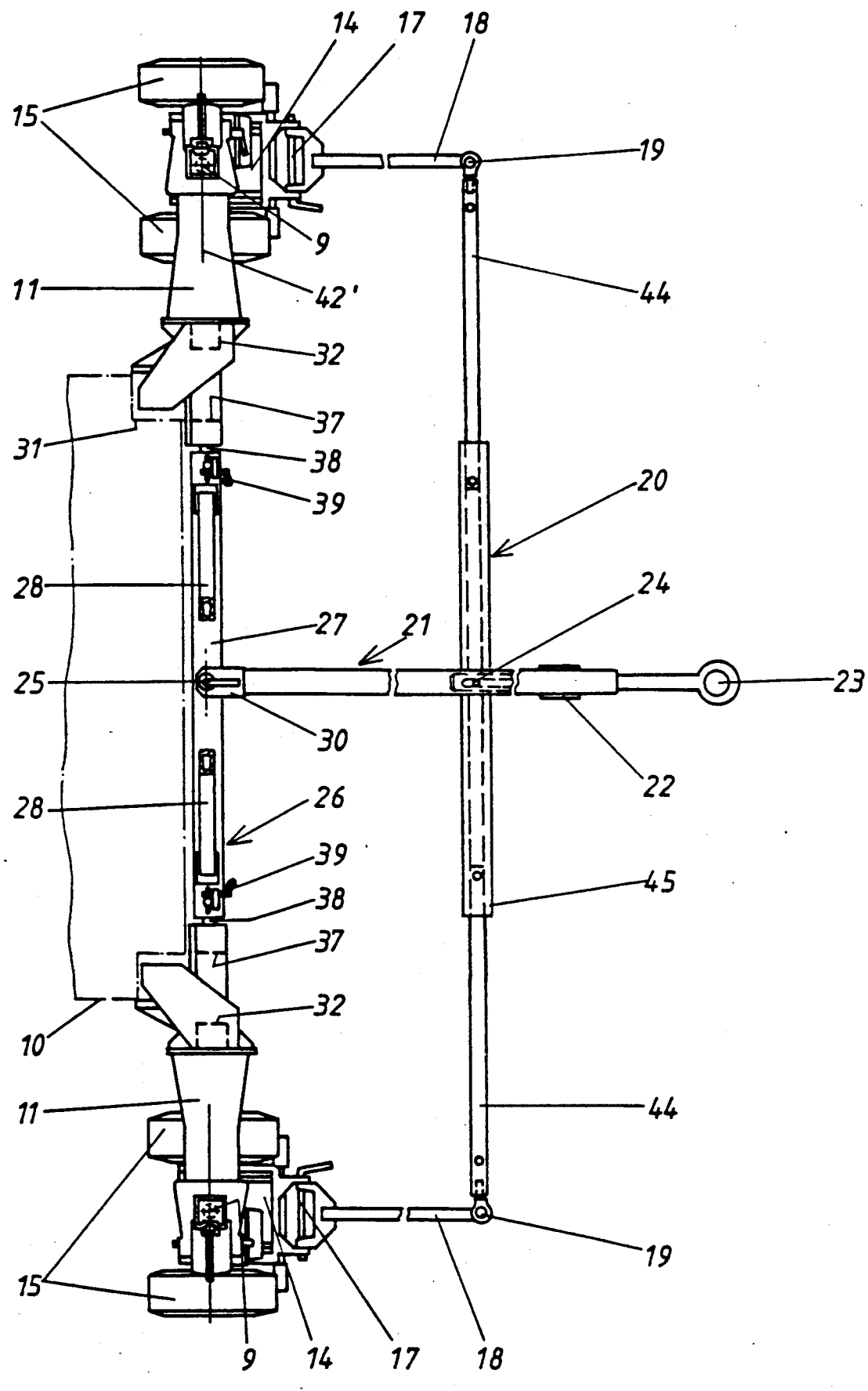

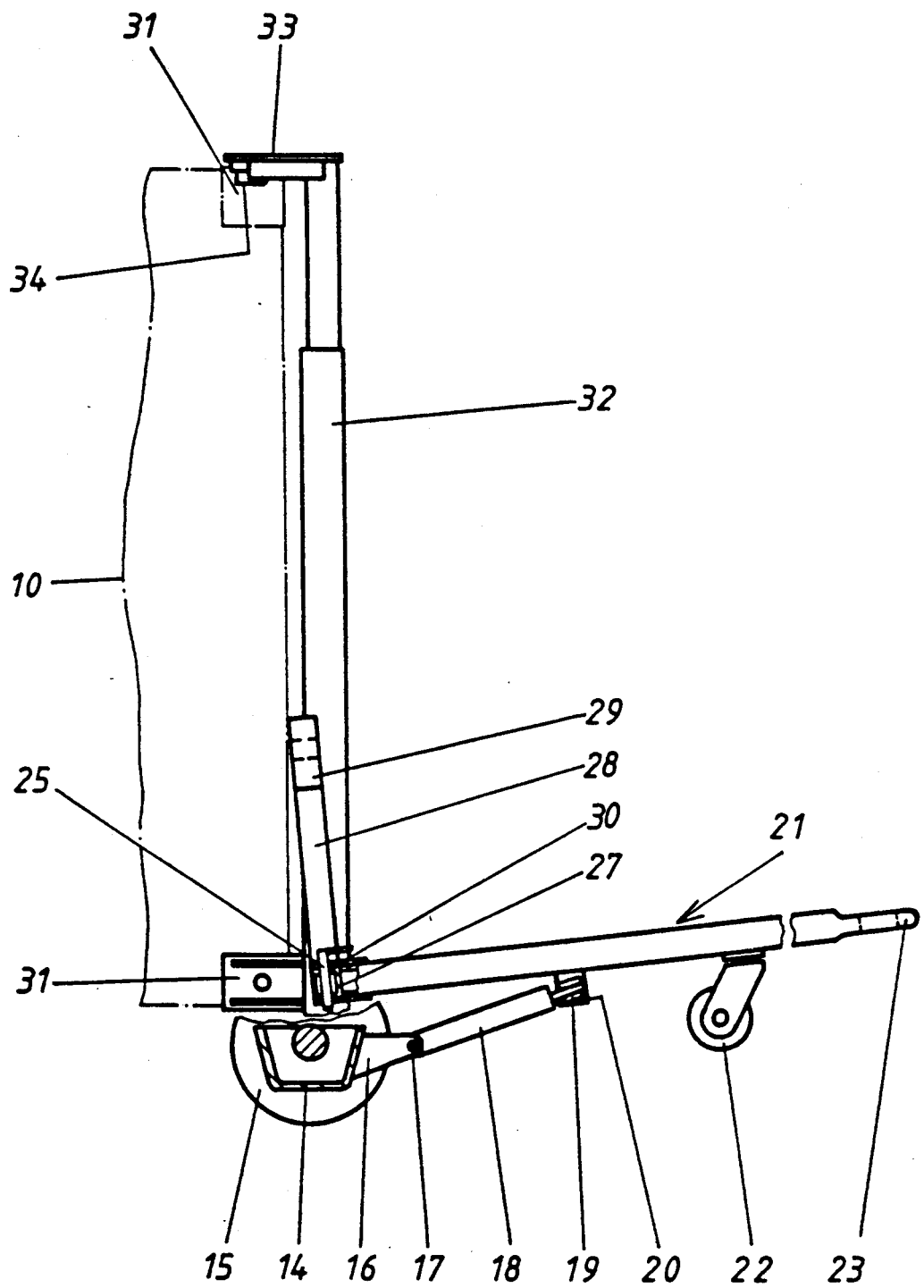

MOBILE AND STEERABLE LIFTING AND SETTING-DOWN APPARATUS FOR LARGE TRANSPORTABLE RECEPTACLES

The invention relates to a mobile and steerable lifting and setting-down apparatus for large transportable receptacles, such as cabins or freight containers, with rack-type jacks which can be secured to the receptacle corners by means of outriggers, whose racks are provided on supports for the large receptacle and which can be raised and lowered along each support, the supports having running wheels mounted on wheel cradles swivellable with respect to the supports for steering manoevres and provided with upwardly and downwardly swingable steering arms connected to a central shaft.

A mobile and steerable lifting and setting-down apparatus of this kind is known from German Patent Specification No. 34 42 307. In this design, the steering arms are articulated to the transverse spar of a central shaft which can be coupled in turn to a tractor. For pulling duty, this apparatus fulfils its purpose satisfactorily. When the apparatus pushes backward, however, because of the articulated connection of the steering arms with the transverse spar of the central shaft, steering of the corresponding running wheels is not possible, because there is a latent danger that the steering arms will "jack-knife" laterally in the process. Added to this is the fact that when the apparatus is travelling down an incline, running thereof onto the tractor is possible. Owing to this, this known mobile and steerable lifting and setting-down apparatus is not safe in traffic, that is to say that it is not suitable for use on surfaces used by traffic, including public roads.

The problem underlying the invention is to avoid the above drawbacks and further develop a mobile and steerable lifting and setting-down apparatus of the type described at the beginning in such manner that its steerability is ensured both in pulling and in backward pushing operation and running onto the tractor on an incline is also prevented.

According to the invention, the above problem is solved in that (a) the steering arms are articulated by their free ends to a steering rod which is mounted to be movable rotationally about its axis, (b) the central shaft is coupled to the steering rod to be relatively movable in the direction of the axis of the shaft, (c) the central shaft is pivoted at one of its ends to a connecting piece which is mounted directly or indirectly on the large receptacle to be swingable about an axis parallel to the base of the receptacle, and (d) the point where the central shaft is pivoted to the connecting piece is located laterally in alignment with the pivots of the two adjacent wheel cradles.

By reason of the above features according to the invention, the steerability of the apparatus is fully ensured both in pulling and in backward pushing operation. In addition, running of the apparatus with the large receptacle onto the tractor during downward travel on an incline is excluded. These advantages are achieved, above all, by the connecting piece arranged between the large receptacle and the central shaft, which connecting piece serves to transmit forces, while the steering of the corresponding running wheels takes place through the central shaft by way of the steering rod and the two steering arms. The shaft is upwardly and downwardly swingable together with the connecting piece, the steering rod and the steering arms and can therefore be coupled, in the usual manner, to towing hitches which may be arranged on tractors at different heights. The connecting piece may be pivotally mounted directly on the large receptacle, e.g. at its ISO corners, or else on mounting parts of the receptacle.

Developments of the invention will appear from the sub-claims.

In an apparatus with connecting posts attachable vertically at the receptacle corners for the outriggers of the rack-type jacks, the connecting piece may be swingably mounted on two laterally neighbouring connecting posts. Such connecting posts are known from German Patent Specification No. 3 442 306. These connecting posts also make adjustment of the travelling wheels of the apparatus possible to tracks of different widths. In this case, there is another advantageous development of the invention which is characterised in that the connecting piece comprises a plurality of articulation points for the central shaft which are arranged on the central axis of the connecting piece and are so positioned that, in any position of adjustment of the running wheels to one of the tracks of different widths, one of the articulation points for the central shaft is located in each instance laterally in alignment with the pivots of the two adjacent wheel cradles.

According to another further development of the invention, the connecting piece has a tubular cross member and a V-shaped tube structure fixed to this by its two ends, and the articulation points for the central shaft are provided at the tip of the V-shaped tube structure and in the centre of the cross member of the connecting piece. Such a connecting piece is cheap to manufacture and has a relatively low weight.

If, according to another further development of the invention, the two articulation points for the central shaft on the connecting piece are arranged offset through an angle of about 90°, when viewed from the side, the connecting piece, for example on utilization of the articulation point on its cross member, can have its V-shaped tube structure swung upward advantageously against one end wall of the large receptacle.

If, according to another further development of the invention, the length of the steering rod is variable telescopically or by means of insertable parts, the adaptation of the apparatus to tracks of different widths of the running wheels is simplified.

The articulation of the central shaft to the connecting piece is suitably effected by means of a pintle lockable in its inserted position. In this way, the coupling of the shaft with the connecting piece at different articulation points is simplified.

The invention is described hereinafter with reference to the drawings of an embodiment. In the drawings.

Figure 1:
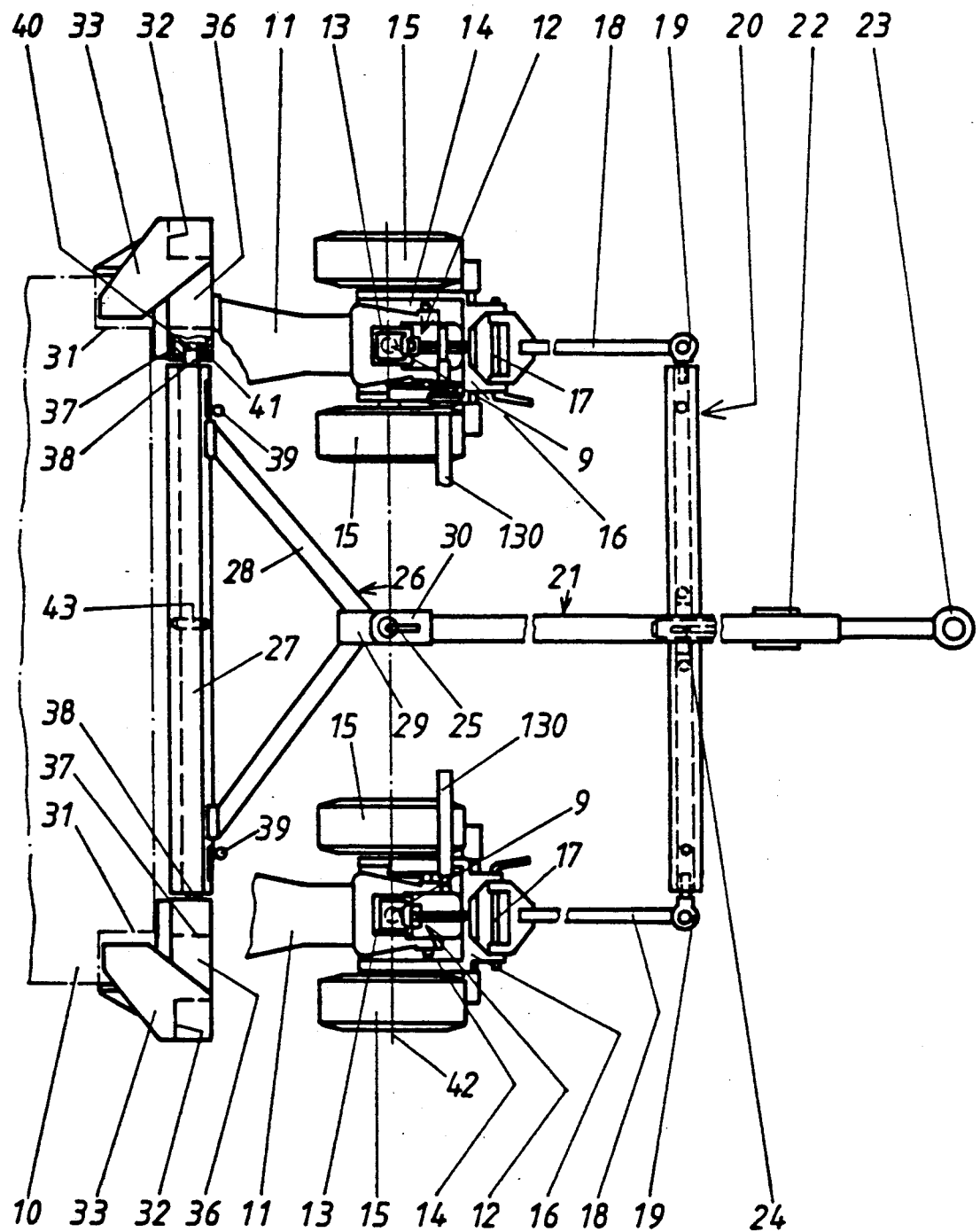
FIG. 1 is a plan view of one end of a large receptacle with attached lifting and setting-down apparatus, more particularly of its steerable part.

FIG. 4 is a plan view similar to FIG. 1, in which, however, the rack-type jacks are so mounted on the corresponding connecting posts that their associated running wheels are adjusted to a wider track compared with FIG. 1, the central shaft being coupled to the cross member of the connecting piece and the steering rod being lengthened axially compared with FIG. 1; and FIG. 5 is a side view of the arrangement shown in FIG. 4.

The mobile and steerable lifting and setting-down apparatus, of which only one half is shown in FIGS. 1, 2 and 4, 5, is intended for large receptacles (e.g. freight containers, cabins or the like) of rectangular plan. The four parts of the lifting and setting-down apparatus are similar, but the running wheels of two laterally adjacent parts of the apparatus are steerable, whereas the running wheels of the other two parts of the apparatus are locked against rotation about their vertical pivots. Not only are these large receptacles 10 to be lifted from the ground and set down on transport vehicles or the other way round by means of this lifting and setting-down apparatus, but the requirement for moving the receptacles over a fairly large distance by means of this lifting and setting-down apparatus may also arise. This means that the lifting and setting-down apparatus must be safe in traffic. Moreover, it may be desirable to attach the rack-type jacks at the corners of the receptacle in different positions, so that the running wheels associated with them are adjusted to different mutual distances apart or tracks. Thus, for example, adjustment of the running wheels to a "narrow track" is necessary when the large receptacle is to be run over an ascent ramp into the cargo space of a transport airplane. On the other hand, the setting-down of a large receptacle on a horizontal loading platform level with the floor of the cargo space of an airplane requires adjustment of the running wheels to a "wide track".

To this end, the mobile lifting and setting-down apparatus has four outriggers 11 of the same type which can be fixed detachably to the corners of the large receptacle 10 and bear in each case a rack-type jack 12, the drives of each two laterally adjacent rack-type jacks 12 being connected by a driving shaft 130, so that only one crank handle (not shown) has to be turned for actuating each pair of jacks 12.

Each rack-type jack 12 can be raised and lowered along a respective support 13, racks (not shown) in which the drive pinions of the jack drives engage being fixed to the supports 13.

The lower ends of the supports 13 are mounted on wheel cradles 14, each of which bears two running wheels 15 in the embodiment. The wheel cradles 14, which are shown in FIGS. 1, 2 and 4, 5, are swivellable for steering purposes at the lower ends of the supports 13 about vertical pivots 9. On the other hand, the other two wheel cradles (not shown) are locked against rotation about these vertical pivots 9 at the lower ends of the supports 13.

Each of the wheel cradles 14 has a forked part 16 to which a steering arm 18 is attached by means of a pintle 17. The steering arms 18 are swingable about the horizontal axes of the pintles 17.

The free ends of the two steering arms 18, which are of equal length, are pivoted to eye pieces 19 which, in turn, are connected so as to be turnably movable to the ends of a telescopable steering rod 20. Consequently, the steering rod 20 is mounted on the eye pieces 19 to be turnably movable about its longitudinal axis.

The reference 21 designates a central shaft which bears a supporting wheel 22 and can be coupled by means of its free ring-shaped end 23 to the towing hitch (not shown) of a tractor. The shaft 21 is coupled to the steering rod 20 through the medium of a pin-and-slot connection 24 so as to be relatively movable in its axial direction.

The inner end of the central shaft 21 is articulated by means of a pintle 25 to a connecting piece 26. The shaft 21 is consequently swingable about the axis of the pintle 25.

The connecting piece 26 has a cross member 27 produced, for example, from a square tube and to which a V-shaped tube structure 28 is rigidly fixed, for example welded, by its two ends. A its tip, the V-shaped tube structure 28 bears a coupling piece 29 with a corresponding receiving bore for the pintle 25. At the inner end of the central shaft 21 there is provided a forked piece 30 which engages over the coupling piece 29 and has two in-line through bores for the pintle 25.

Figure 3:
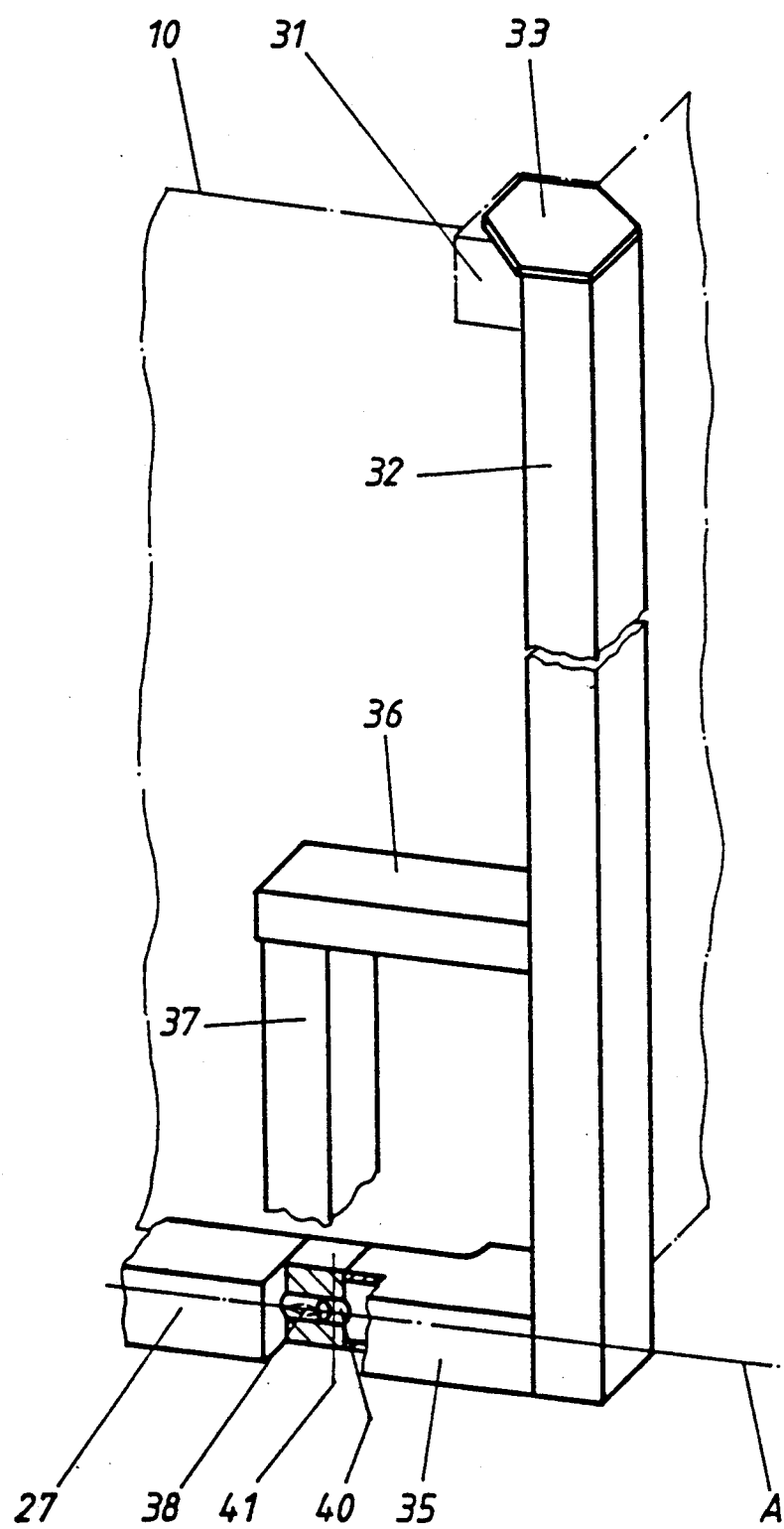
FIG. 3 is an oblique view of a connecting post for one of the rack-type jacks, the post being fixed to a corner of the receptacle and approximately of the receptacle height and the view being partly in section in order to illustrate the mounting of the connecting piece for the central shaft on the post.

Reference will now be made to FIGS. 3 and 5. At each corner of the large receptacle 10, standardized corner mounts (so-called ISO corners) 31 are provided at the top and bottom, to which mounts a connecting post 32 of approximately receptacle height can be attached in each case across and at a distance with respect to the receptacle 10. At its upper end, the connecting post 32, which consists of a square tube, bears an arm 33 to which a stud 34 for connection to the upper corner mount 31 is fixed. To the lower end portion of each connecting post 32 there are fixed, for example by welding, two support arms 35, 36 arranged horizontally at a vertical distance from one another, between whose ends another, suitably shorter, vertical connecting post 37 for the outrigger 11 is fixed. The lower end of the connecting post 32 can be connected to the lower corner mount 31 at each corner of the receptacle through the medium of an extension (not shown) and a fixing screw.

In dependence upon the particular requirements, the outriggers 11, with the rack-type jacks 12 and the supports 13, may be mounted optionally on the connecting posts 32 or 37 at each corner of the receptacle. In the embodiment according to FIGS. 1 and 2, the outriggers 11 are mounted on the inner shortened connecting posts 37. The four pairs of running wheels 15 are thereby adjusted to the so-called "narrow track".

The cross member 27 of the connecting piece 26 is provided at its two ends with bearing pins 38 arranged on a common axis which are forced outwardly by springs (not shown) and can be retracted by means of knobs 39 into the cross member 27 in order to be able to push the latter in between two laterally adjacent connecting posts 37. At its end remote from the connecting post 32, each support arm 35 is provided with a welded-on bearing piece 41 (FIG. 3) containing a receiving bore 40 for a bearing pin 38. It will be apparent from the foregoing that the connecting piece 26 is mounted on the laterally adjacent support arms 35 of the connecting posts 37 to be swingable about an axis A which extends parallel to the base of the large receptacle 10. Together with the connecting piece 26, the central shaft 21, the steering rod 20 and the steering arms 18 are also movable up and down, in order to be able to couple the shaft 21 to towing hitches which may be arranged at different heights on various tractors.

Figure 2:
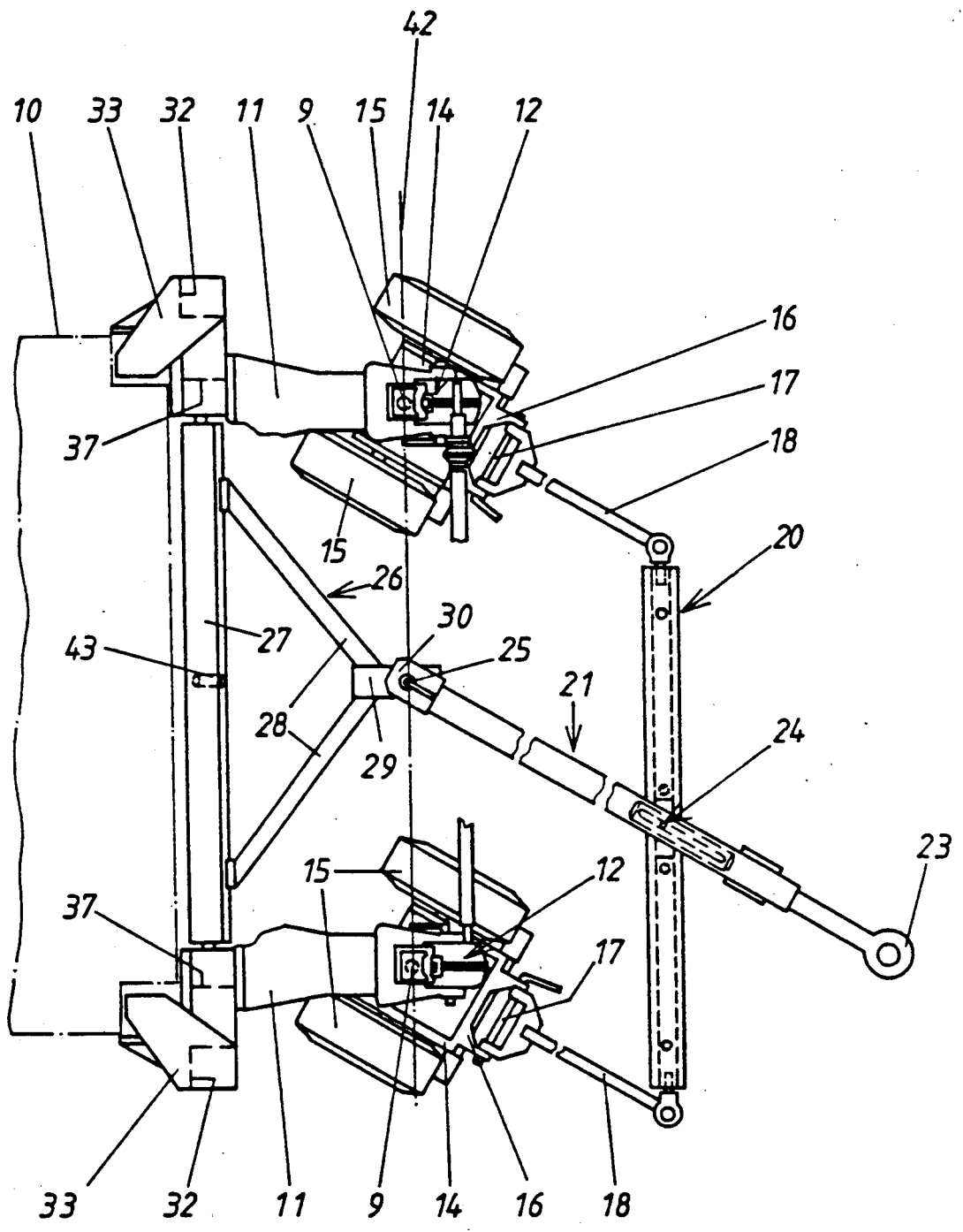
FIG. 2 is a plan view similar to FIG. 1, but with the running wheels turned.

The steerability of the pairs of running wheels 15 shown in FIGS. 1 and 2 is ensured both in pulling and in backward pushing operation, corresponding tractive or pushing forces acting in each case on the large receptacle 10 through the central shaft 21, the connecting piece 26 and the connecting posts 32. For the steerability of the pairs of running wheels 15 shown in FIGS. 1 and 2, it is important that the shaft 21 is axially movable with respect to the steering rod 20 and its articulation point on the connecting piece 26, formed by the pintle 25, is located laterally in alignment with the vertical pivots 9 of the two wheel cradles 14, as indicated in FIGS. 1 and 2 by the chain-dotted line 42.

In the embodiment shown in FIG. 4, the outriggers 11 are mounted on the lower ends of the connecting posts 32, so that the two pairs of running wheels 15 are adjusted to a so-called wide track. In this version, the central shaft 21 is articulated directly to the cross member 27 of the connecting piece 26 which, compared with FIG. 1, is swung upwardly against one end wall of the large receptacle 10. To this end, the cross member 27 has a through bore 43 for the pintle 25. The through bore 43 extends parallel to the V-shaped tube structure 28 and (viewed from the side) is consequently arranged offset through 90° from the through bore in the coupling piece 29.

The steering rod 20 is lengthened in accordance with the greater lateral distance between the steering arms 18. In the embodiment, this is effected in that two telescopic rods 44 are appropriately withdrawn from a square tube 45 and then locked together with this square tube 45. The telescopic rods 44 likewise consist of square tubes which, fitting in the square tube 45, are mounted to be axially slidable.

As is apparent from FIG. 4, the articulation point of the central shaft 21 on the cross member 27 of the connecting piece 26, which is formed by the pintle 25, is also laterally in alignment in this arrangement with the vertical pivots 9 of the wheel cradles 14 (see also the chain-dotted line 42'). The telescopic rods 44 form with the square tube 45 a rigid steering rod 20 which transmits the steering movements to the wheel cradles 14 by way of the steering arms 18.

The pintle 25 is secured in its inserted position shown in FIGS. 1, 2 and 4, 5 by locking means (not shown).

We claim:

1. Mobile and steerable lifting and setting-down apparatus for large transportable receptacles, with rack and pinion jacks which can be secured to corners of the receptacles by means of outriggers, whose racks of the rack and pinion jacks are provided on supports for the large receptacle so that the large receptacle can be raised and lowered relative to each support, the supports having running wheels mounted on wheel cradles, pivotable with respect to the supports for steering maneuvers and the wheel cradles being provided with upwardly and downwardly swingable steering arms connected at one end to said wheel cradles, characterized in that
   (a) the steering arms (18) are articulated by another end to a steering rod (20) which is mounted to be movable rotationally about its axis,
   (b) a central shaft (21) which is coupled to the steering rod (20) at a coupling point which is movable along the axis of the central shaft,
   (c) the central shaft (21) is pivoted at one of its ends to a connecting piece (26) which is mounted directly or indirectly on the large receptacle (10) to be swingable about an axis (A) parallel to the ground,
   (d) the point (25) where the central shaft (21) is pivoted to the connecting piece (26) is located laterally in alignment with the pivots (9) of two adjacent wheel cradles (14).

2. Apparatus according to claim 1 with connecting posts attachable vertically at the receptacle corners for the outriggers of the rack-type jacks, characterized in that the connecting piece (26) is swingably mounted on two laterally neighboring connecting posts (32, 35).

3. Apparatus according to claim 1 with running wheels adjustable to tracks of different widths, characterized in that the connecting piece (26) comprises a plurality of articulation points (29, 43) for the central shaft (21) which are arranged on the central axis of the connecting piece and are so positioned that, in any position of adjustment of the running wheels (15) to one of the tracks of different widths, one of the articulation points for the central shaft (21) is located in each instance laterally in alignment with the pivots (9) of the two adjacent wheel cradles (14).

4. Apparatus according to claim 3, characterized in that the connecting piece (26) has a tubular cross member (27) and a V-shaped tube structure (28) fixed to this by its two ends, and the articulation points for the central shaft (21) are provided at the tip (29) of the V-shaped tube structure (28) and in the center of the cross member (27) of the connecting piece (26).

5. Apparatus according to claim 4, characterized in that the two articulation points (29, 43) for the central shaft (21) on the connecting piece (26) are arranged offset through an angle of about 90 degrees, when viewed from the side.

6. Apparatus according to claim 3, characterized in that the length of the steering rod (20) is variable telescopically or by means of insertable parts.

7. Apparatus according to claim 1 characterized in that the articulation of the central shaft (21) to the connecting piece (26) is effected by means of a pintle (25) lockable in its inserted position.

8. Apparatus according to claim 2 with running wheels adjustable to tracks of different widths, characterized in that the connecting piece (26) comprises a plurality of articulation points (29, 43) for the central shaft (21) which are arranged on the central axis of the connecting piece and are so positioned that, in any position of adjustment of the running wheels (15) to one of the tracks of different widths, one of the articulation points for the central shaft (21) is located in each instance laterally in alignment with the pivots (9) of the two adjacent wheel cradles (14).

* * * * *